(12) United States Patent
Wise

(10) Patent No.: US 11,794,627 B2
(45) Date of Patent: Oct. 24, 2023

(54) FOLDING CAMPING APPARATUS

(71) Applicant: Rick Wise, Bend, OR (US)

(72) Inventor: Rick Wise, Bend, OR (US)

(*) Notice: Subject to any disclaimer, the term of this patent is extended or adjusted under 35 U.S.C. 154(b) by 0 days.

(21) Appl. No.: 17/580,503

(22) Filed: Jan. 20, 2022

(65) Prior Publication Data

US 2022/0227282 A1 Jul. 21, 2022

Related U.S. Application Data

(60) Provisional application No. 63/139,470, filed on Jan. 20, 2021.

(51) Int. Cl.
*B60P 3/39* (2006.01)
(52) U.S. Cl.
CPC ...................... *B60P 3/39* (2013.01)
(58) Field of Classification Search
CPC ........................................................ B60P 3/34
See application file for complete search history.

(56) References Cited

U.S. PATENT DOCUMENTS

| | | | | |
|---|---|---|---|---|
| 3,709,551 A | * | 1/1973 | McCarthy | B60P 3/34 |
| | | | | 296/26.02 |
| 3,941,415 A | * | 3/1976 | Cooper | B60P 3/34 |
| | | | | 296/26.07 |
| 4,807,924 A | * | 2/1989 | Kottke | B60P 3/34 |
| | | | | 296/26.06 |
| 5,135,278 A | * | 8/1992 | Kauffman | B60P 3/34 |
| | | | | 296/173 |
| 6,840,569 B1 | * | 1/2005 | Leigh | B60P 3/34 |
| | | | | 296/26.06 |

FOREIGN PATENT DOCUMENTS

| | | | |
|---|---|---|---|
| FR | 2296545 | * | 7/1976 |
| KR | 10 1911617 | * | 10/2018 |

* cited by examiner

*Primary Examiner* — Joseph D. Pape
(74) *Attorney, Agent, or Firm* — Donn K. Harms

(57) ABSTRACT

A folding camper has a body having a lower end configured for positioning within a bed of a pickup truck or on a trailer. The camper has sidewalls rotationally engaged between the roof and body whereby the folding camper is moveable between a collapsed position wherein a first sidewall and a second sidewall and a front wall and rear wall are all folded to a substantially horizontal positioning, to a deployed positioning wherein the roof is elevated above an upper end of the body with the first sidewall and the second sidewall both rotated to a substantially vertical positioning.

6 Claims, 9 Drawing Sheets

FOLDING CAMPING APPARATUS

This application claims priority to U.S. Provisional Patent application Ser. No. 63/139,470, filed on Jan. 20, 2021, which is incorporated herein in its entirety by this reference thereto.

BACKGROUND OF THE INVENTION

1. Field of the Invention

The invention herein disclosed relates generally to vehicle engageable camping structures. More particularly, it relates to a camper having a continuously centered roof, which is removably engageable with a pickup truck or trailer and easily changed from a collapsed configuration to a deployed configuration.

2. Prior Art

Pickup trucks are highly popular vehicles primarily employed for work and for hauling materials in the bed of the pickup truck. However, because of the ability of such vehicles to haul significant weight in the rear-positioned bed, they are also widely used to hold campers and camping components which are removably engageable within the bed of the truck. Such allows the vehicle to be used for both work, and for more enjoyable activities such as camping. As such, many pickup truck owners who enjoy such camping activities will convert their pickup trucks either temporarily or permanently to campers.

Because of the popularity of camping, there are numerous pickup truck conversions which are readily commercially sold to pickup truck owners who wish to permanently or temporarily convert their pickup trucks to campers.

Permanent camping conversions generally include a self-contained fixed in position, hard-sided camper unit, which is engaged with the bed of the pickup truck. Conventionally, such campers are equipped with home-type appliances such as sinks, stoves, and refrigerators and the like. Such rigid or hard-sided campers have a substantially rigid shell structure which projects above a lower end which is located in the bed of the pickup truck. Where the truck is also used for work or hauling, such campers are conventionally adapted to slide into a removable engagement with the pickup truck bed.

However, such rigidly constructed campers, by projecting above the bed and cab of the pickup truck, will cause a significant reduction in fuel economy of the vehicle. Further, the extension of the camper above the truck bed and cab imparts a significant raising of the center of gravity of the vehicle which can render it hard to handle on curves and in high winds.

While there exist collapsible and soft sided campers which engage with the bed of a pickup truck, such have their own issues. For example, soft sided campers are less than secure when camping in areas also occupied by animals such as bears.

With respect to the above, before explaining at least one preferred embodiment of the pickup truck engageable folding camper system herein, it is to be understood that the system invention is not limited in its application to the details of employment and to the arrangement of the components or the steps set forth in the following description or illustrated in the drawings. The various apparatus and operations of the herein disclosed pickup truck engageable folding camper system herein are capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other folding hard-sided campers which are removably mounted upon pickup trucks. It is important, therefore, that the embodiments, objects and claims herein, be regarded as including such equivalent construction and methodology insofar as they do not depart from the spirit and scope of the present invention.

SUMMARY OF THE INVENTION

The disclosed device herein provides an easily employed, collapsible and hard-sided camper device. The camper device is removably engageable with the bed of a conventional pickup truck or may be trailer-mounted.

The camper device, as herein disclosed, moves between a collapsed position and an elevated or deployed position, through the rotation of opposing sidewalls which are in a sliding connection to a roof. Particularly preferred, in all modes of the device herein, is a roofing system having continuous bias imparted to sliding components thereof, to maintain the roof centered over the base and folding sidewalls at all times. It was found in experimentation that maintaining the roof continuously centered and with a continuous bias imparted to roller mounts engaged between the roof and both sidewalls allowed for smoother operation during opening and closing. Further, jambs which occurred during opening and collapse of the camper device without the biasing system, were found to be substantially eliminated with the flexible members biasing the roller mounts in this biased system.

The sidewalls of the camper device herein are preferably formed of rigid material and are in a rotating connection at one end thereof with a rigid body of the camper device. In this rotating connection the sidewalls may be tilted upward to the deployed position wherein they are substantially perpendicular to the plane of a slidably engaged roof which, as noted, remains continuously centered over both sidewalls. The sidewalls may also be rotated downward to a position substantially parallel to the plane of the roof which remains centered thereover when the camper device is moved to the compact or stored configuration.

Hydraulic or pneumatic cylinders or combinations thereof are preferably operatively engaged between the body of the camper device and both the sidewalls. In this position the cylinders may be employed to actuate or assist in the rotating of the sidewalls from the horizontal positioning to the vertical or upward. These hydraulic/pneumatic cylinders, much like those employed on the tailgate of a car, provide a biased assist in the upward tilting of both sidewalls by storing energy therein during the downward movement of both sidewalls.

Once the opposing sidewalls are rotated to their elevated positioning substantially perpendicular to the plane of the roof, a front wall, which is in a rotating connection to the body such as with hinges or pivots, and a rear wall also in a similar rotating connection to the body, may be rotated to substantially perpendicular positioning relative to the plane of the roof. During both the raising and lowering of the sidewalls, as noted, the roof is maintained centered over the lower body which prevents jamming and sticking of the moving components in both directions.

A door is operatively positioned in the rear wall to allow entry and exit from the formed interior cavity of the camper device while in the elevated or deployed positioning.

Key to the smooth operation of the system, is the provision of the roof with the two opposing sidewalls in a manner which will avoid jamming of either or both sidewalls during opening and closing of the camper for use or storage. Because the upward and downward movement of the opposing sidewalls, in their respective engagements to the roof, can impart uneven force to the roof, it is important to provide a flexible member in a connection which prevents such jamming. It is especially important because, over time, the sidewalls can have and will gain their own issues as to resistance rotational movement such that uneven sliding force imparted by one sidewall to the roof, is highly likely.

In the development of the camper system herein, after multiple configurational attempts, it was determined that imparting a continuous tensional or biasing force to the sliding rollers engaged between the roof and the two sidewalls, such that the perimeter edge of the roof is maintained in substantial alignment with the perimeter of the camper body, provided prevention to jamming during opening and closing. Further such tensioning or continuous biasing maintained the roof substantially level during elevating and retracting which also helped prevent jamming.

Consequently, a flexible member providing tensioning of each of the pivoting assemblies and rollers thereon, using an engaged or integral biasing component or member, such as a spring, provided the ongoing tension to each roller required. Alternatively, this biasing can be provided using elastic flexible members formed of rubber rope or polymeric material which is elastic and will stretch during opening of the sidewalls and contract during the closing thereof.

In another mode of the device herein such tension, in an automatic mode of the device, can be provided by electric motors engaged with the cable or flexible member system which can be electronically monitored for current use to maintain a constant tension on the cable by varying the electric current supplied to each.

With respect to the above description, before explaining at least one preferred embodiment of the pickup truck engageable, folding camper system herein, it is to be understood that the invention is not limited in its application to the details of operation nor the arrangement of the components or the steps set forth in the following description or illustrations in the drawings. The various methods of implementation and operation of the camper herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other hard-sided folding camper systems which are engageable with a pickup truck, and for carrying out the several purposes of the disclosed string line support system. Therefore, the objects and claims herein should be regarded as including such equivalent construction, steps, and methodology insofar as they do not depart from the spirit and scope of the present invention.

It is an object of this invention to provide a collapsible camper apparatus which is configured for removable engagement with the bed of a truck or which may be positioned upon a small trailer frame.

It is another object of this invention to provide such a camper apparatus wherein the roof is load bearing in both the collapsed position and the elevated or deployed position to allow for camping in inclement weather.

It is a further object of this invention to provide an operative bearing and track engagement between the rotating sidewalls and the roof whereby driven or energy-storing cylinders can be employed to bias the opposing sidewalls upward both of which will concurrently elevate the roof.

It is yet another object of the invention to provide a fast bed-to-camper latch system allowing for engagement of the camper with the truck bed and thereby eliminate external tie downs required of conventional truck engageable campers.

It is yet another object of this invention, to provide such a collapsible camper device and system, which is configured to prevent jamming during opening and closing thereof.

These, together with other objects and advantages which become subsequently apparent, reside in the details of the construction and operation of the system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURE

DETAILED DESCRIPTION OF THE PREFERRED EMBODIMENTS OF THE INVENTION

Figure 1:
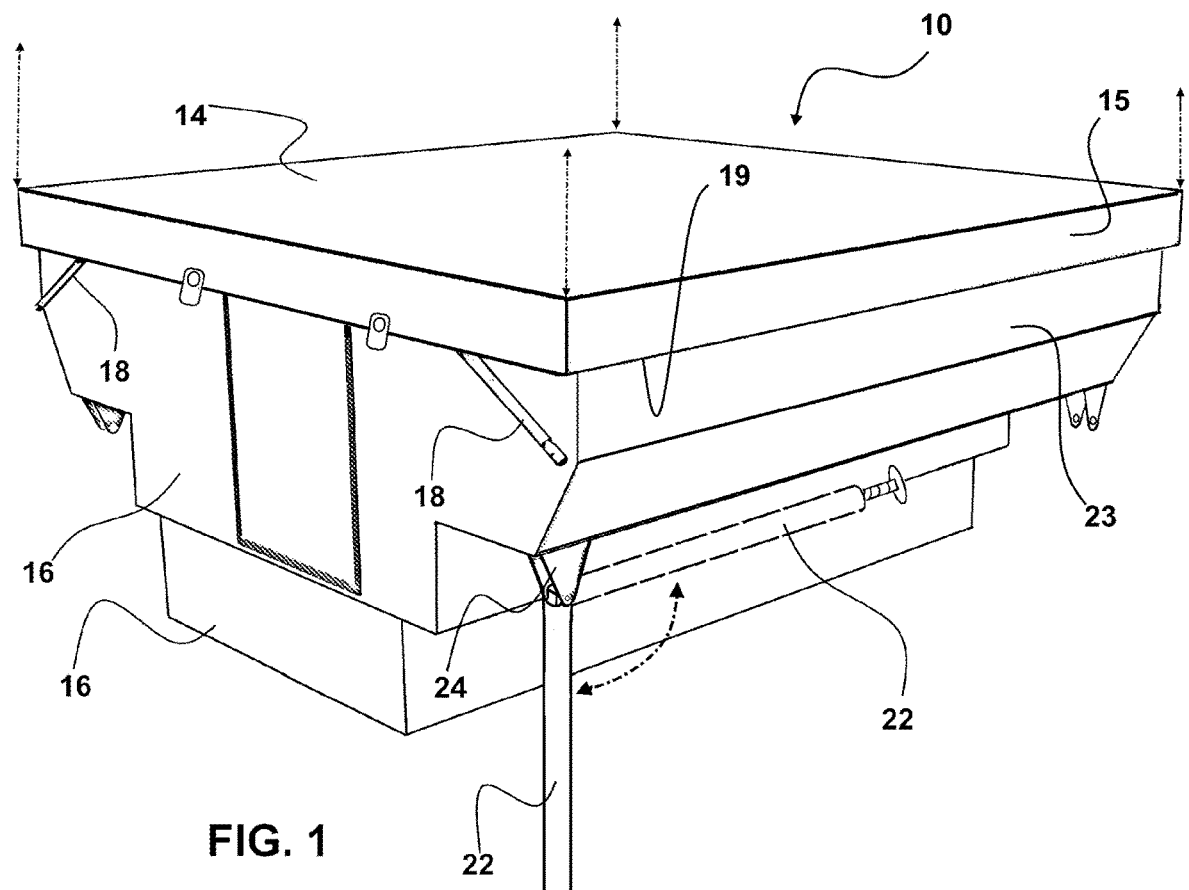
FIG. 1 depicts a rear perspective view of the folding camper device herein showing it in the collapsed position and also showing a pivotally engaged camper jack.

Referring now to the device 10 herein in the depictions of FIGS. 1-12, there is seen in FIG. 1, a rear perspective view of the folding camper device 10 herein. As shown in FIG. 1, the device 10 is in a collapsed configuration. The device 10 can be moved between this collapsed configuration and the elevated position shown in FIG. 2. In all modes, the device 10 is configured for operative engagement to a wheeled vehicle such as a trailer or such as the bed of a pickup truck 12. Such operative engagement is well known where the body 16 of such a camper device 10 will slide into the open area of the bed of a pickup truck 12 and once so positioned is held removably engaged by connectors adapted to such.

Figure 2:
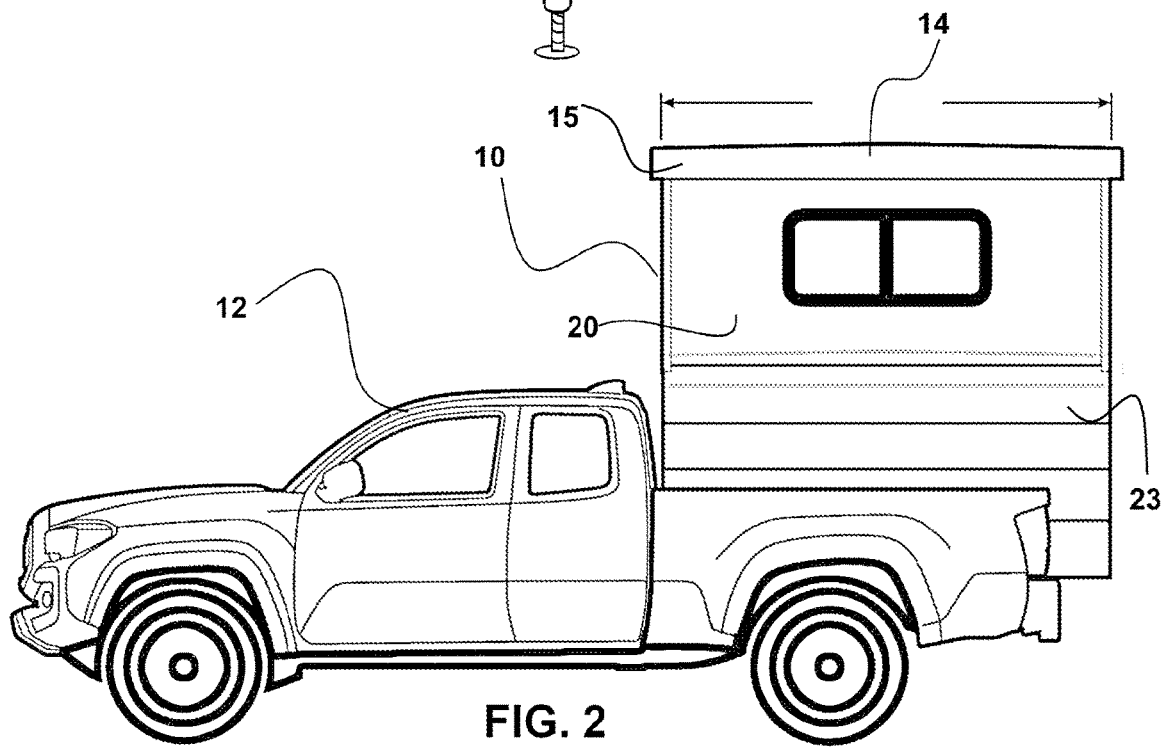
FIG. 2 shows the camper device herein operatively positioned within a truck bed and moved to the deployed or elevated position for occupancy by the user.

As shown in FIG. 1, the roof 14 is preferably formed of metal or composite materials such as fiberglass or carbon fiber or the like, such that it is weight bearing in both the collapsed position as in FIG. 1, and the elevated position as in FIG. 2.

The body 16 of the device 10, which is configured for operative engagement to a vehicle such as a pickup truck 12, is rotationally engaged with each of two sidewalls 20 and with a front wall 34 (FIG. 4) and a rear wall 26 opposite the front wall 34. The body 16 is preferably of rigid self-supporting construction such as composite materials or fiberglass or the like.

Figure 3:
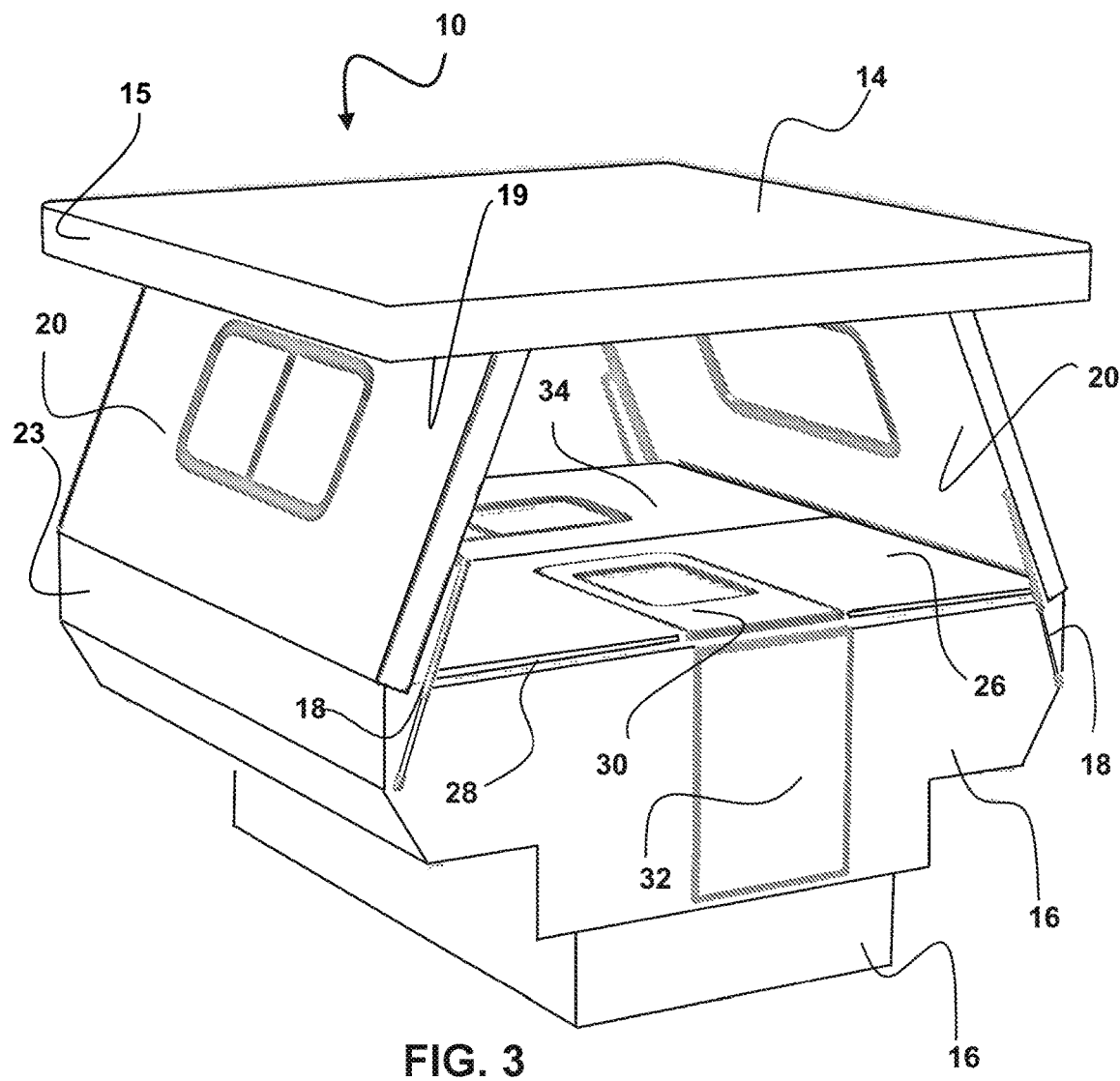
FIG. 3 shows the camper device of FIG. 1, being actuated from the collapsed position of FIG. 1 toward the deployed or elevated position of FIG. 2, through powered cylinders which tilt opposing sidewalls upward and concurrently raise the roof through sliding pivotable bearings engaged therebetween.

In all modes of the device 10, biasing components such as cylinders 18 are operatively engaged between the body 16 and sidewalls 20 (FIG. 3). The biasing members such as the shown cylinders 18, are gas-charged hydraulic cylinders and employ stored air or gas pressure to continuously urge them to an expanded position. Alternatively, such cylinders 18 may employ a powered fluid supply, to impart a biasing to the cylinders 18 to expand.

This biasing toward an expanded configuration by onboard stored pneumatic power, or a fluid pump, allows for easy and substantially automatic raising of the sidewalls 20, from the collapsed position of FIG. 1 toward the elevated position of FIG. 2. However, other biasing components, which will store energy as the sidewalls 20 are moved toward the collapsed position, may be used to open the device 10 herein from that collapsed position of FIG. 1 to the elevated position as in FIG. 2. Such alternative biasing components or biasing members may be employed as would occur to those skilled in the art, such as collapsing springs, weights, or other compression components. However, currently a hydraulic cylinder which is gas charged, or fluid powered are currently preferred due to ease of use and replacement.

Also preferred, in all modes of the device 10, are jacks 22 which are employable for raising and lowering the camper device 10 to and from operative engagement within the bed of the truck 12 and/or for leveling when parked on uneven surfaces. Preferably the jacks 22 are in a pivoting engagement 24 to the body 16 such as a connection on a rotating pin or hinge. This allows the jacks 22 to pivot upward during travel.

As noted, FIG. 2 shows the camper device 10 herein, operatively positioned within a truck bed of a truck 12 and with the sidewalls 20 pivoted to reach a raised position. This pivoting of the raised position using the biasing power of the biasing members such as the cylinders 18, concurrently lifts the roof 14. In the position of FIG. 2, both the sidewalls 20 and the roof 14 are weight bearing. As with other components, preferably, the sidewalls 20 are formed of a substantially rigid lightweight material such as carbon fiber, fiberglass, or other light weight material.

The sidewalls 20 are operatively engaged to the roof 14 in a continuously centered sliding engagement therebetween. The sliding engagement herein maintains the roof 14 substantially centered over both the sidewalls 20 and the perimeter edge of the body 16 as the roof 14 raises or lowers during the tilting up or down of the sidewalls 20, such as in FIG. 3.

By maintaining the roof 14 and interior edge of the ledge 15 centered over the body 16 and perimeter edge thereof and around the perimeter of the folded sidewalls 20, the roof 14 will easily lower and cover the perimeter edges of the two folded sidewalls 20 and the perimeter edge of the body 16, such as in FIG. 1. A latch or other connector configured to hold the roof 14 lowered is preferred to hold the biasing energy in the biasing members such as cylinders 18. No user intervention is required since the pulley and cable centering system, noted herein, operates to maintain the roof 16, so centered, during raising and lowering, which was found, in experimentation, to substantially eliminate jamming during use.

Figure 6:
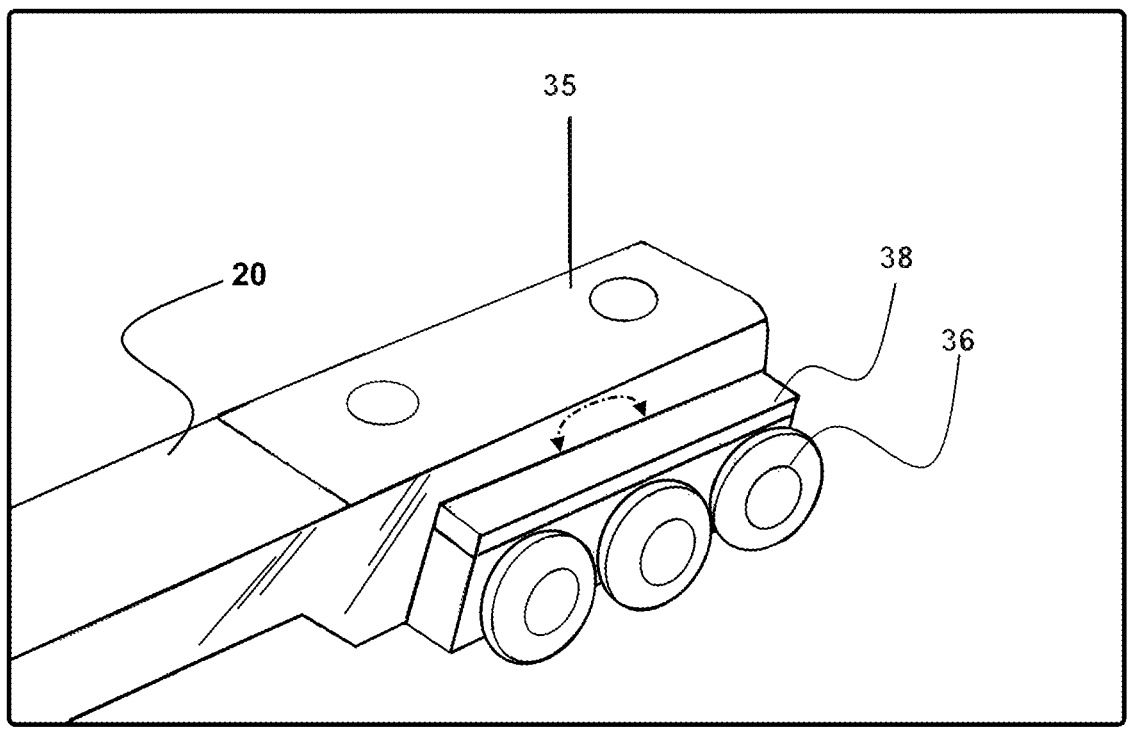
FIGS. 6-7 depict one example of the sliding and pivoting engagement between the roof and sidewalls in the form of tri-linear rollers which engage in a track and which are engaged to a mount allowing for side-to-side translation therewith during the rising and collapsing process to and from the collapsed position and elevated position.
Figure 7:
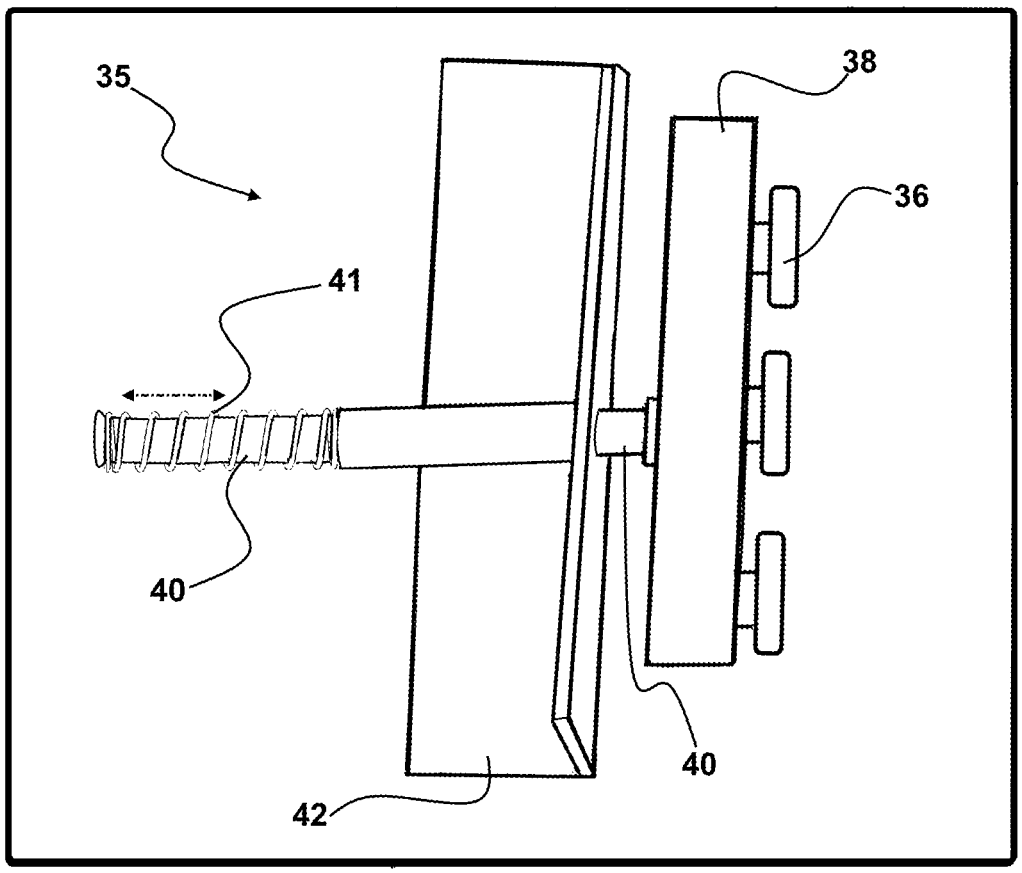

Currently, such a continuously centered sliding engagement is accomplished using a plurality of rollers engaged with a pivoting assembly which itself is in a sliding engagement to a mount. Such is shown in FIGS. 6-7 and described below.

As shown in FIG. 3, the camper device 10 herein is being actuated from the collapsed position of FIG. 1, and moving toward the deployed or elevated position of FIG. 2. The cylinders 18, shown operatively engaged between the opposing sidewalls 20 and the body 16. Each of the opposing sidewalls 20 is at a lower end connected in a respective rotating engagement or connector 29 with the body 16, such as with a hinge or other pivoting connector.

Figure 8:
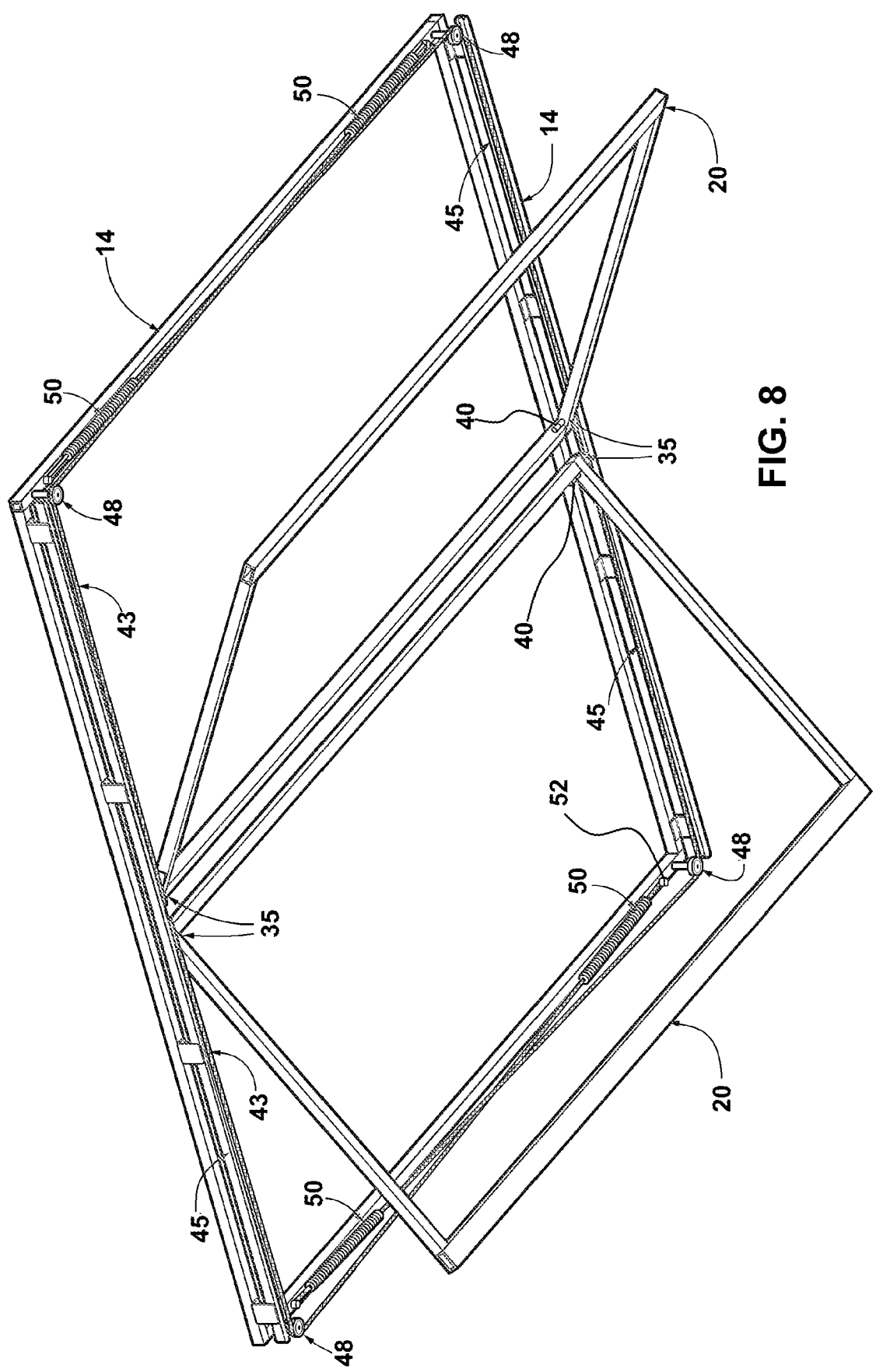
FIGS. 8-9 show a mode of the roof-centering assembly herein depicting the frame of the roof engaged with the sidewalls and biasing of flexible members such as spring-loaded cables providing a constant biasing force to maintain the roof centered with the sidewalls during the lifting and lowering of the roof.

As the device 10 moves toward the elevated configuration of FIG. 1, the power provided by the cylinders 18 moves both of the sidewalls 20 upward toward a substantially perpendicular positioning relative to the roof 14. Distal ends of each sidewall 20 are in a respective sliding engagement to the roof 14 such as shown in FIG. 8. As the sidewalls 20 elevate to a vertical position, they slide in their engagement with the roof 14, until they reach the substantially perpendicular positioning such as in FIG. 2. The roof 14 is held elevated by the opposing sidewalls 20 and both are weight bearing in such positioning.

Also shown in FIG. 3 is the rear wall 26 which is in a hinged or rotating connection 29 with a rear portion of the body 16, and remains in a fixed position during the raising of the sidewalls 20 and roof 14. An upper door portion 30 is pivotally connected to the rear wall 26, and a lower door portion 32 is pivotally connected to the body 16. Once the two sidewalls 20 are fully raised, the rear wall 26 is positionable to a raised position by rotation thereof on the pivoting rotating connection 29 with the body 16.

Figure 4:
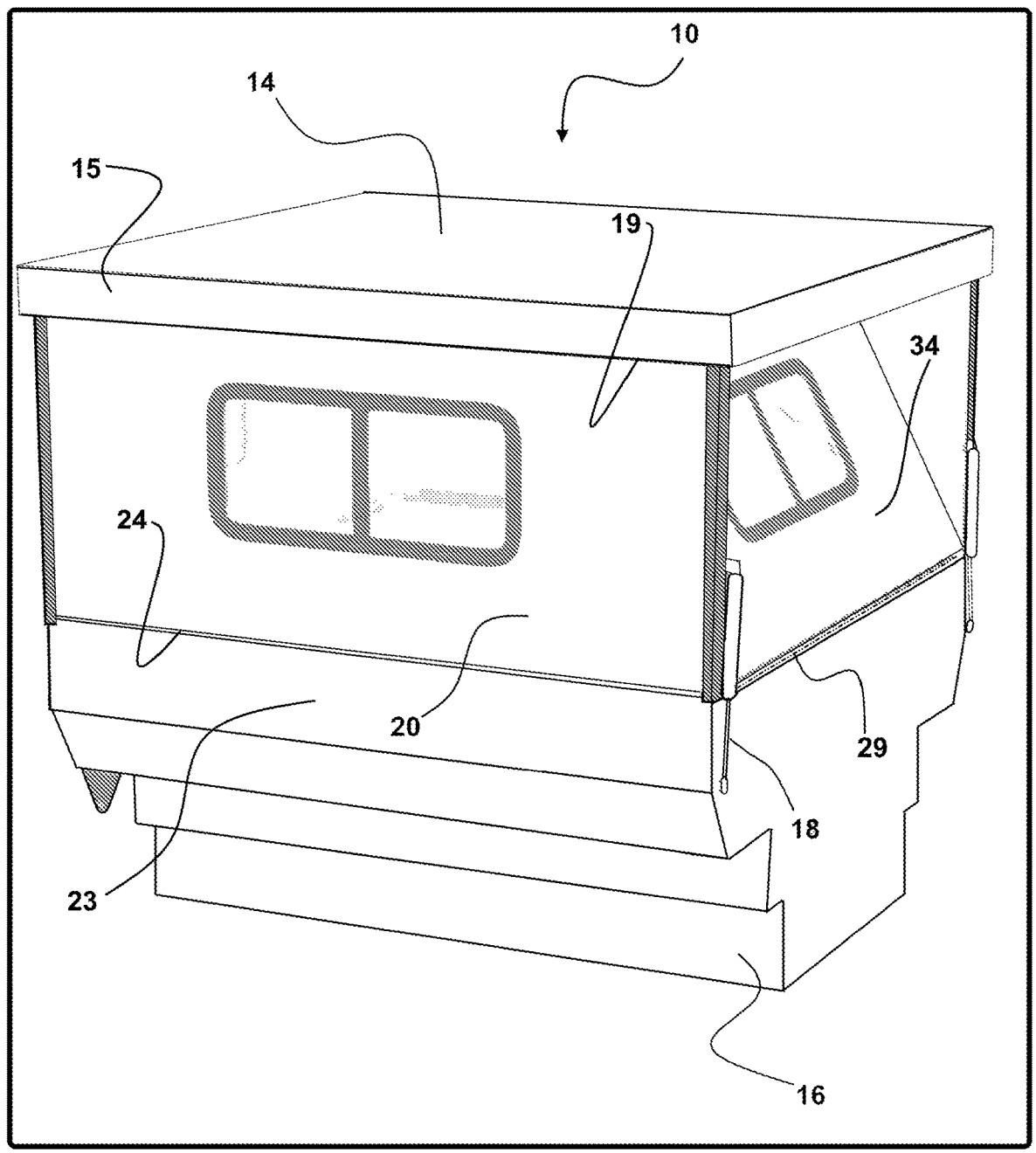
FIG. 4 shows the device of FIGS. 1-3 from a front perspective view, showing the sidewalls fully elevated and showing the front wall moving from a collapsed position, as in FIG. 3, to a fully elevated position as would be in FIG. 2.

In FIG. 4 is shown the device 10 of FIGS. 1-3 from a front perspective view, showing the front wall 34 with a hinge or rotating connector 29 with a front section of the body 16. As noted above, once the two sidewalls 20 are fully elevated, the rear wall 26 and the depicted front wall 34 may be rotated to elevated positioning where they are substantially perpendicular to the plane of the roof 14. Locks or magnets or other connectors may be used to hold the front wall 34 and rear wall 26 engaged to the roof 14 or adjacent sidewalls 20.

Figure 5:
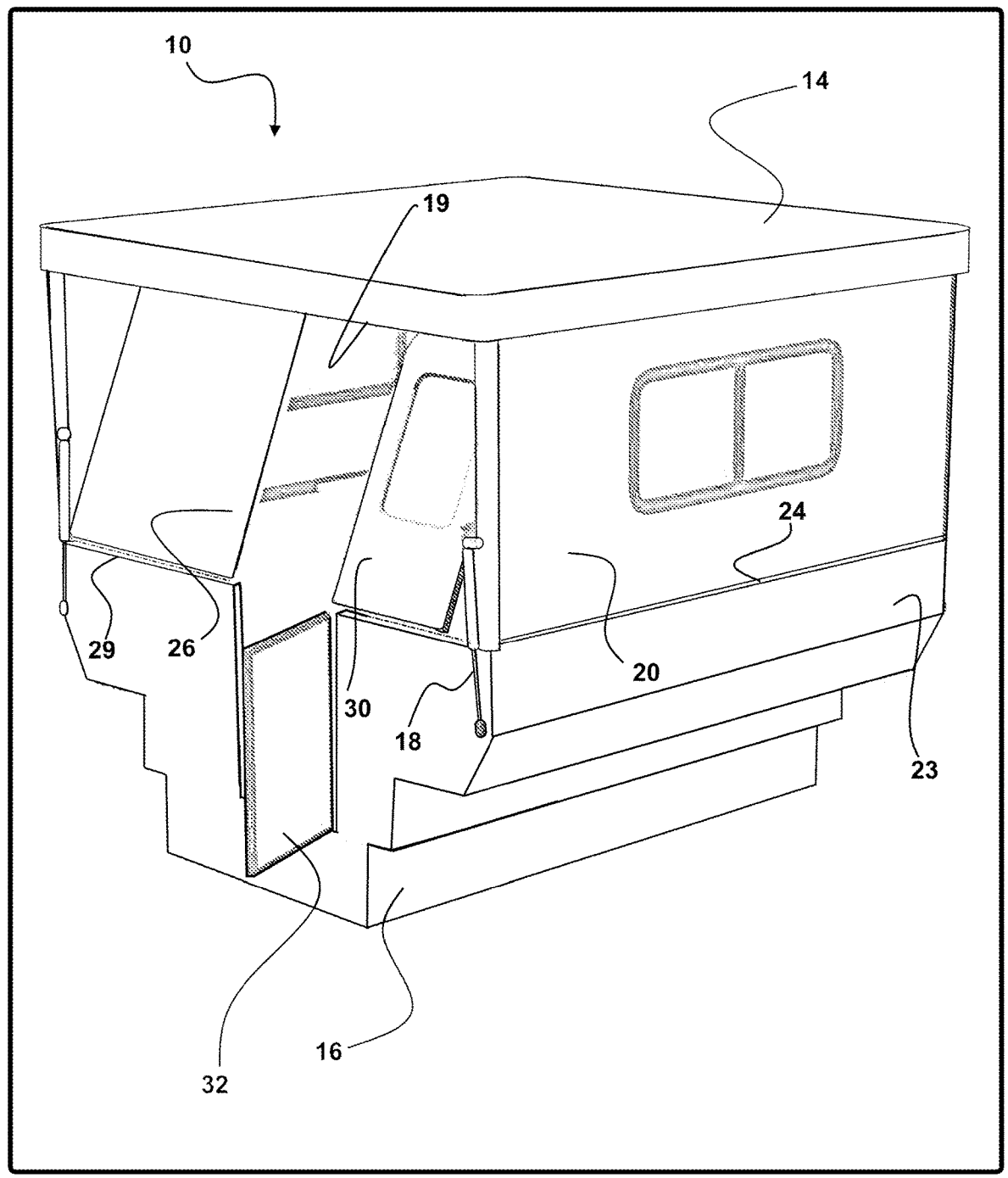
FIG. 5 shows the device herein, as in FIG. 4, wherein the sidewalls are fully elevated in their sliding engagement with the roof, and the rear wall is being elevated to a substantially perpendicular position.

The operative elevated positioning of the rear wall 26 is shown in FIG. 5. As noted, once both sidewalls 20 are fully elevated and supporting the roof 14, such as shown in FIGS. 4-5, this rear wall 26 may be rotated upon the rotating connector 29, such as a hinge, to a fully elevated position which is substantially perpendicular to the plane of the roof 14 and sidewalls 20. Once both the front wall 34, shown in FIG. 4, and the rear wall 26, as shown in FIG. 5, are fully pivoted on their rotating connectors 29 with the body, they may be locked in place until the camper device 10 is moved back to the collapsed positioning of FIG. 1, in a reverse of the above noted process.

One preferred sliding and pivoting engagement between the distal end of each sidewall 20 and the roof 14, may be formed by a pivoting assembly 35 (FIGS. 6 and 7) having a plurality of rollers 36 which are aligned and engaged with a roller mount 38. This roller mount 38 is connected with a support shaft 40 which is in a sliding and pivoting connection with a shaft mount 42 which connects to the sidewalls 20. The rollers 36 of each pivoting assembly 35, in operation of the device 10, are operatively positioned within a track 45 (FIG. 9), and as the sidewalls 20 are raised or lowered, the rollers 36 of each pivoting assembly 35 maintain a sliding connection with the track 45 mounted to the roof 14.

In this manner, as the user moves the camper device 10 between the collapsed position of FIG. 1, to the raised or deployed position such as in FIG. 2, the roof 14 will automatically be raised and lowered concurrently with the sidewalls 20. Further, with the camper device 10 in the raised position, the user is provided the protection of a rigid front wall 34, rigid rear wall 26, a rigid weight bearing roof 14, and rigid sidewalls 20 surrounding them.

Figure 9:
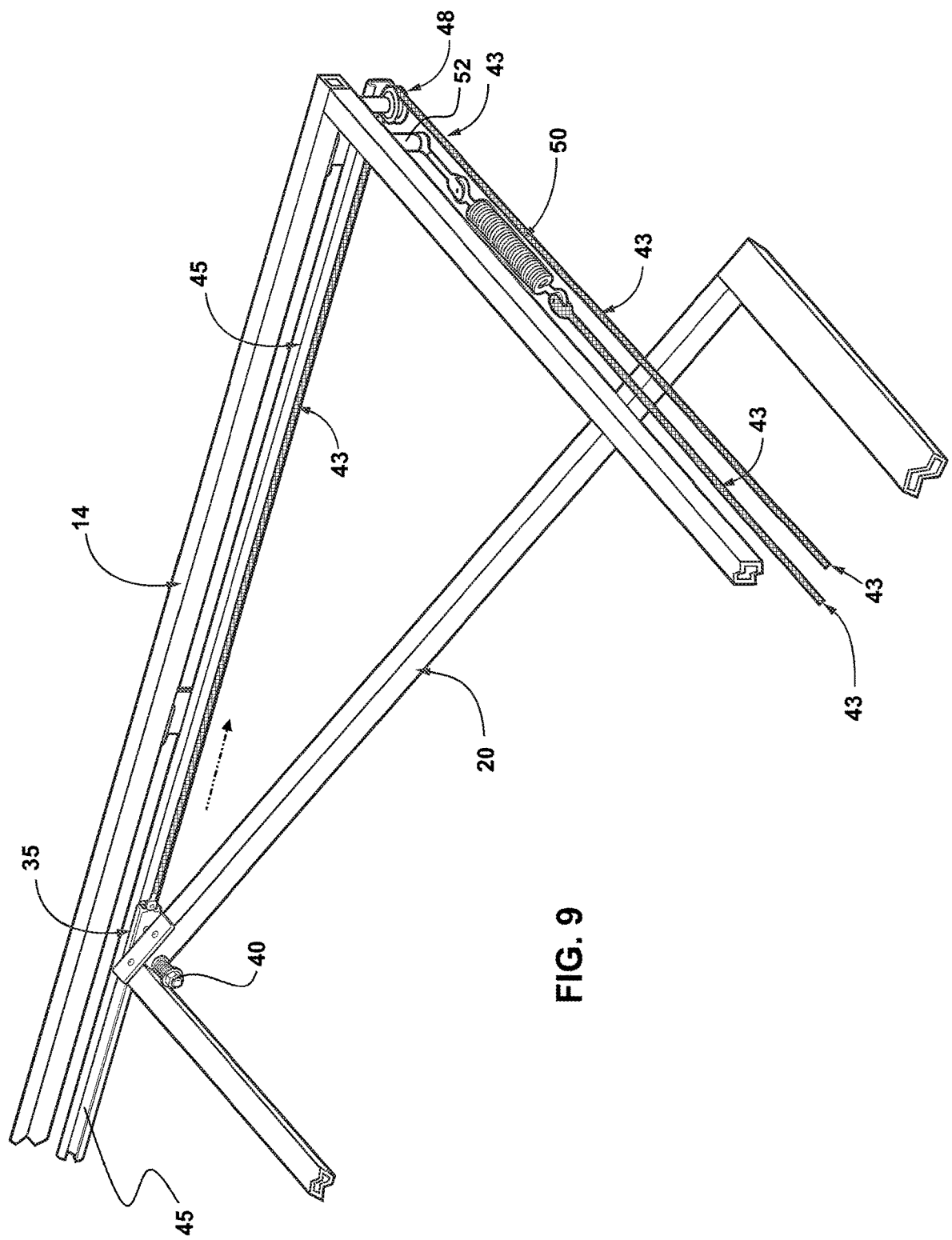

Additionally preferred, in the device herein, as shown in FIG. 8-9, are a roof-centering assembly. By roof-centering assembly herein is meant, an assembly of components engaged with the roof 14, such as the pivoting assemblies 35 engaged in a track 45, where the centering assembly operates to maintain the roof 14 centered above the body 16 at all times, such that a ledge cavity 19 defined by the interior perimeter edge surface of a ledge 15 extending from the roof 14 is maintained centered over the perimeter edge 23 of the body 16. Thus, using a roof centering assembly, as noted, or in another form as would occur to those skilled in the art, maintains the roof 14 substantially level and aligned with and substantially centered around a perimeter edge 23 of the body 16 of the device 10 substantially at all times. By perimeter edge 23 of the body is meant a portion of the exterior surface of the body 16 at the pivoting engagements 24 with the two sidewalls 20 and the front wall 34 and the rear wall 26 such as with rotating connectors 29 or hinges. Of course, another form of roof centering assembly, as would occur to those skilled in the art, may be employed. However, the described roof centering assembly of FIGS. 8-10 has shown to work well and is currently preferred.

The roof centering assembly herein includes a plurality of pivoting assemblies 35 having centering springs 41 portioned upon each support shaft 40 thereof. Each of the pivoting assemblies of the roof centering assembly herein, is engaged to a flexible member, such as a cable 43 (FIG. 8) or a flexible elastic member 53, shown in FIG. 10.

To provide ongoing biasing force to the pivoting assemblies 35 engaged at first ends of each flexible member, in one mode where the flexible member is a cable 43, a biasing member, such as a spring 50 is engaged to one end of each such flexible member or cable 43. A second end of each flexible member, such as a cable 43 or the elastic member 53, is operatively engaged with a respective pivoting assembly 35, which, as noted, is engaged to the rollers 36 which are engaged within the track 45 positioned on the roof 14.

During movement of the roof 14, from the position of FIG. 1 to that of FIG. 3 and back again, the sidewalls 20 are connected at opposing sides to the shaft mount 42 of each pivoting assembly 35. Each pivoting assembly 35 has rollers 36 pivotally engaged with a roller mount 38 rotationally engaged to the shaft mount 42 by the support shaft 40.

Figure 10:
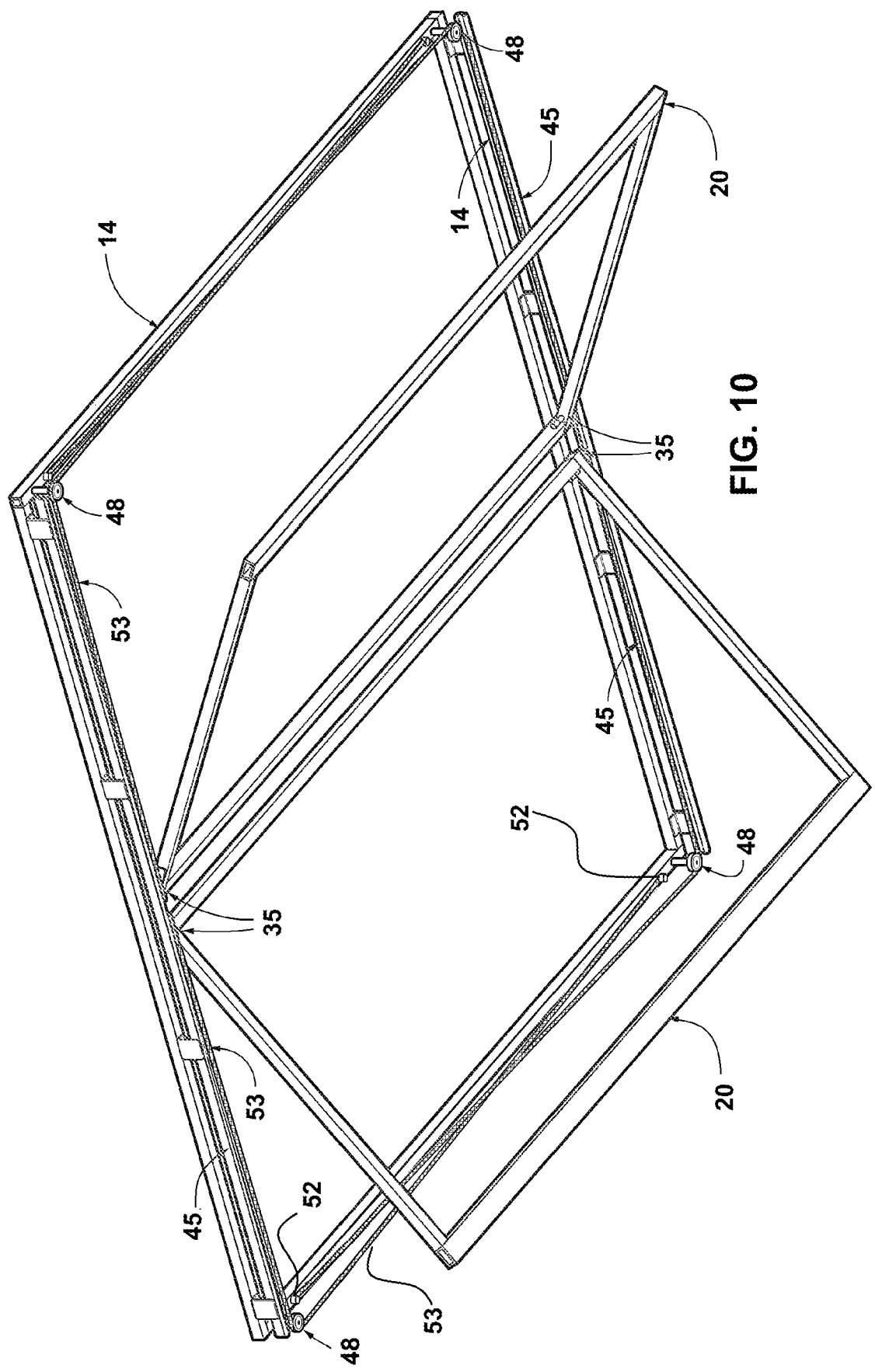
FIG. 10 shows a mode of the roof-centering assembly herein wherein flexible elastic members provide the constant bias upon the pivoting assembly and rollers during movement of the sidewalls and roof.

The rollers 36 will roll within the track 45, and the roller mount 38 will rotate in its engagement on the support shaft 42 of the pivoting assembly 35 to accommodate the different angles achieved as the sidewalls 20, in their connection to the track 45 and to the shaft mount 42 as the sidewalls 20, move upward. In this fashion, the biased movement of the sidewalls 20 connected to the shaft mount 42 of the pivoting assembly 35 at each end thereof, moves the rollers 36 and the pivoting assembly 35 from a central position on the roof 14 as shown in FIGS. 8 and 10, along the track 45 engaged with the roof 14, and toward side edges of the roof 14.

As noted, each sidewall 20 is connected to a pivoting assembly 35 at each of two ends thereof. Each of the pivoting assemblies 35 is connected to a first end of a respective flexible member, such as a cable 43 (FIG. 8) or elastic member 53 (FIG. 10), which follows a path around a pulley 48 to an engagement of the second end of the flexible member or cable 43 with the one end of a biasing member or spring 50, or to a fixed mount or anchor 52 where the elastic member 53 is used. The second end of each biasing member or spring 50 is anchored 52 to the roof 14.

With the pivoting assemblies 35 in the central area of the roof 14, as shown in FIG. 8, where the roof 14 would be lowered, the biasing members or springs 50 connected to each respective flexible member, such as a cable 43, are elongated or stretched. As the two sidewalls 20 pivot upwards, the movement of each pivoting assembly 35 connected to each cable 43, is urged or enhanced by the biasing force of each elongated biasing member or spring 50 contracting and pulling on the cable 43 engaged to each pivoting assembly 35.

The flexible members, such as cables 43, are each of a fixed length, and thus, the elongation and contraction of the biasing members, such as springs 50 maintain a substantially equal biasing force on each of the pivoting assemblies 35 engaged on opposite ends of each sidewall 20. This constant biasing force urges each of the pivoting assemblies away from the central area, as shown in FIG. 8, and toward the side edges of the roof 14.

The constant and substantially equal biasing force of this biasing assembly, from the bias imparted to each of the two pivoting assemblies 35 engaged to opposite ends of each sidewall 20, eliminates sticking from misaligned rollers 36 in tracks 45 and operates to maintain the roof 14 centered over the body 16 at all times such as shown in FIG. 1.

It is this biasing force, imparted to each flexible member or cable 43 by each biasing member or spring 50 engaged at the second end thereof, which maintains the roof 14 centered at all times above the perimeter edge of the body 16.

In another mode of the device 10 herein the flexible members are formed from elastic material such as rubber rope or another polymeric material which will stretch, and impart a biasing force to the flexible member to contract, in much the same was as the spring 50 imparts to the cable 43. In this mode, shown in FIG. 10, the flexible member imparting the biasing force to each pivoting assembly 35 is formed by a flexible member formed of elastic material 53. As the two sidewalls 20, at their upper edge connection to each pivoting assembly 35, move toward the center of the roof 14, the flexible member formed by elastic material 53 elongates and imparts the biasing force to each pivoting assembly 35 in the same fashion as described using a spring 50 above.

Thus, using a flexible member such a cable 43 having a biasing member formed by a spring 50, or using a flexible member formed by elastic material 53 which is anchored 52 in the same fashion as the mode with the spring 50, a first end of the flexible member imparts a biasing force to each pivoting assembly 35 urging it away from the central area of the roof 14 shown in FIGS. 8-10. This maintains the biasing force upon the track-engaged pivoting assemblies 35 which are connected to the sidewalls 20 using the shaft mounts 42 (FIG. 7), at all times. This continuous biasing force of the assemblies 35 toward the sidewalls 20 has been found to prevent jamming, and more importantly, to form and provide a force to help open the device when in the collapsed configuration.

Figure 11:
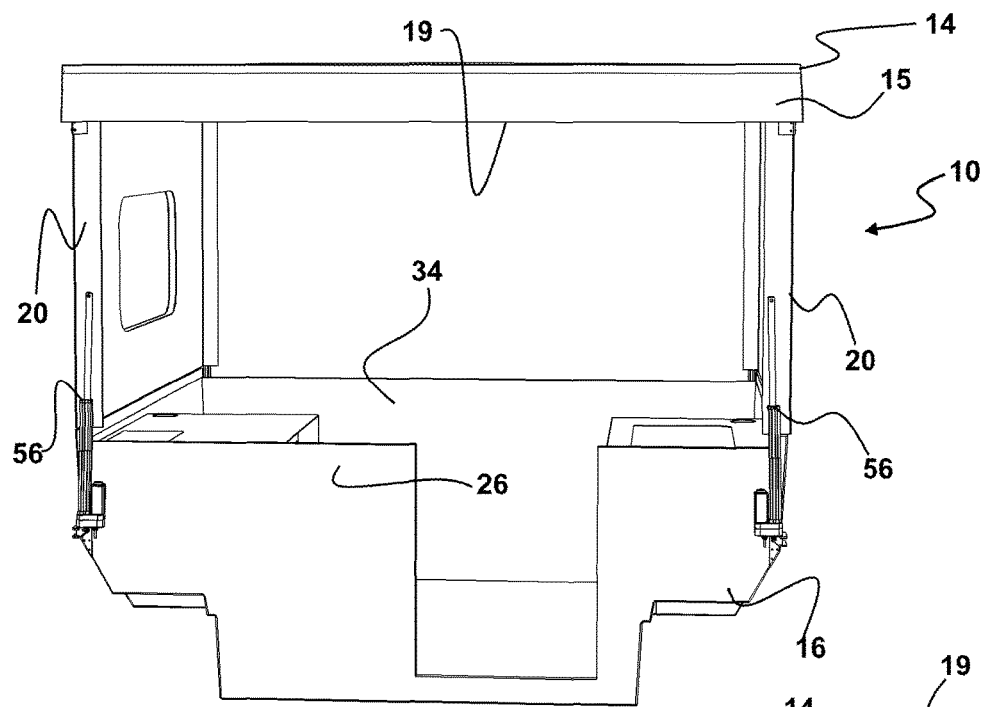
FIG. 11 shows a mode of the camper device herein wherein having electric powered cylinders which, when operatively connected to electric power, will expand and contract under power from the cylinders and allow for push-button expansion and collapse of the camper device.
Figure 12:
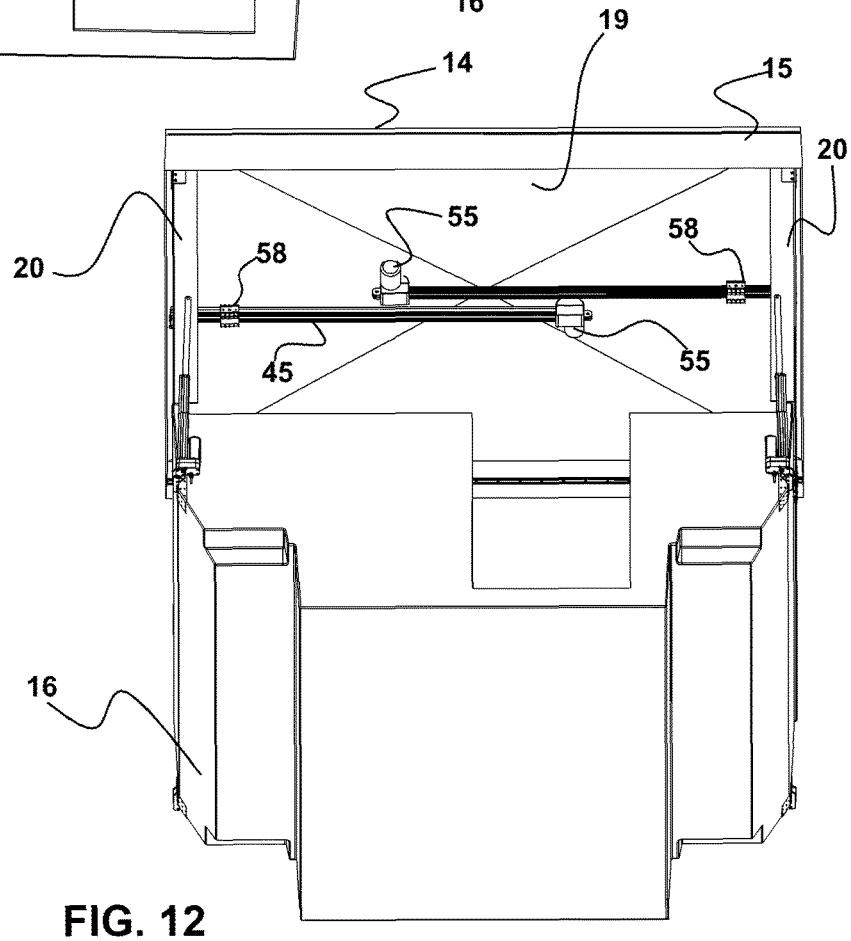
FIG. 12 shows lower perspective view of the camper device as in FIG. 11 showing electric motors engaged with the roof provide the roof-centering assembly which maintain the roof centered over the perimeter edge of the body of the device.

Another mode of the camper device 10 herein, shown in FIGS. 11-12, provides powered cylinders 56 which, when operatively connected to electric power, will expand and contract. Such a configuration will allow for push-button expansion and collapse of the camper device. In this mode, the camper device 10 will expand and contract in the same fashion as noted above but is aided by the electric power which operates the powered cylinders 56 to expand or contract. Such conventionally available cylinders operate with internal pumps and hydraulic fluid, and are also available with internal electric motors operating gear trains which will expand and contract a shaft extending from the cylinder portion, and are well known.

In this mode of the camper device 10, the roof centering assembly instead of using flexible members engaged with biasing members, the device employs electric motors 55 engaged to rotate the sidewalls 20 using tracks 45 and slides 58 connected to the electric motors 55. Using a microprocessor, having software running to monitor the electric current draw of each motor 55 (not shown but well known), the electric current provided to each motor 55 is continuously adjusted to maintain equal force to be imparted to pull and push each of the sidewalls 20 upward and downward. Again, while more complicated than using biasing force imparted to the pivoting assemblies 35 by flexible members, the employment of electric motors 55 along with the powered cylinders 56 allows for push button operation, while still maintaining the roof 14 centered and level in the fashion, noted above.

This centering force insures smooth operation of the device 10 because the roof 14 will always elevate, and more importantly, will always collapse toward the body 16, with the projecting ledge 15 of the roof 14 in position to easily engage around the perimeter edge of the body 16, as shown in FIG. 1. As shown in FIG. 1, a portion of the perimeter edge of the body 16, adjacent the sidewalls, front wall 34 and rear wall 26, is positioned within a ledge cavity 19 defined by the interior perimeter of the ledge 15.

While all of the fundamental characteristics and features of the pickup truck engageable, folding camper system, have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A folding camper, comprising:
 a body, said body having a lower end configured for positioning within a bed of a pickup truck or on a trailer;
 said body having a perimeter edge communicating around four sides of said body at an upper end thereof opposite said lower end;
 a first sidewall having a lower end thereof rotationally engaged to said upper end of said body;
 a second sidewall having a lower end thereof rotationally engaged to said upper end of said body opposite said first sidewall;
 a front wall, said front wall having a lower end thereof rotationally engaged to said upper end of said body in between said first sidewall and said second sidewall;
 a rear wall, said rear wall having a lower end thereof rotationally engaged to said body on a side of said body opposite said front wall;
 a roof, said roof having a ledge extending around a perimeter edge of said roof, said ledge defining a ledge cavity on an underside of said roof;
 a top end of said first sidewall in a sliding engagement thereof with a lower side of said roof;
 a top end of said second sidewall in sliding engagement thereof, with said lower side of said roof;
 said folding camper having a collapsed position wherein said first sidewall and said second sidewall and said front wall and said rear wall are all folded to a substantially horizontal positioning and said perimeter edge of said body at said upper end thereof is positioned within said ledge cavity;
 a roof centering assembly having a first pivoting assembly and having a second pivoting assembly;
 said first pivoting assembly having at least one roller positioned upon a first roller mount which is rotationally engaged to a first shaft mount connected to said first sidewall;
 said second pivoting assembly having at least one roller positioned thereon upon a second roller mount which is rotationally engaged to a second shaft mount connected to said second sidewall;
 said roller of said first pivoting assembly engaged within a first track connected to said roof;
 said roller of said second pivoting assembly engaged with a second track connected to said roof;
 a first flexible member engaged at a first end thereof to said first pivoting assembly, said first flexible member imparting a first continuous biasing force to urge said first sidewall toward said vertical positioning;
 a second flexible member engaged at a first end thereof to said second pivoting assembly, said second flexible member imparting a second continuous biasing force to urge said second sidewall toward said vertical positioning; and said folding camper moveable from said collapsed position to a deployed position wherein said roof is elevated above said perimeter edge at said upper end of said body with said first sidewall and said second sidewall both rotated to a substantially vertical positioning.

2. The folding camper of claim 1, additionally comprising:

a first hydraulic cylinder having a first end thereof connected to said first sidewall and a second end thereof connected to said body;

a second hydraulic cylinder having a first end thereof connected to said second sidewall and having a second end thereof connected to said body;

said first hydraulic cylinder imparting a first biasing force to said first sidewall while in said horizontal positioning to rotate to said vertical positioning thereof;

said second hydraulic cylinder imparting a second biasing force to said second sidewall while in said horizontal positioning to rotate to said vertical positioning thereof; and wherein said first biasing force and said second biasing force urge said roof to said deployed position.

3. The folding camper of claim 1, additionally comprising:

said first continuous biasing force communicated to said first flexible member by a first spring engaged to a second end of said first flexible member; and said second continuous biasing force communicated to said second flexible member by a second spring engaged to a second end of said second flexible member.

4. The folding camper of claim 2, additionally comprising:

said first continuous biasing force communicated to said first flexible member by a first spring engaged to a second end of said first flexible member; and said second continuous biasing force communicated to said second flexible member by a second spring engaged to a second end of said second flexible member.

5. The folding camper of claim 1, additionally comprising:

said first flexible member formed of elastic polymeric material;

said first continuous biasing force communicated to said first flexible member generated by an elongation of said elastic polymeric material forming said first flexible member during movement of said folding camper from said deployed position to said collapsed position;

said second flexible member formed of said elastic polymeric material; and said second continuous biasing force communicated to said second flexible member generated by an elongation of said elastic polymeric material forming said second flexible member during movement of said folding camper from said deployed position to said collapsed position.

6. The folding camper of claim 2, additionally comprising:

said first flexible member formed of elastic polymeric material;

said first continuous biasing force communicated to said first flexible member generated by an elongation of said elastic polymeric material forming said first flexible member during movement of said folding camper from said deployed position to said collapsed position;

said second flexible member formed of said elastic polymeric material; and said second continuous biasing force communicated to said second flexible member generated by an elongation of said elastic polymeric material forming said second flexible member during movement of said folding camper from said deployed position to said collapsed position.

* * * * *